United States Patent [19]

Shigematsu et al.

[11] Patent Number: 4,715,258

[45] Date of Patent: Dec. 29, 1987

[54] POWER TRANSMISSION FOR USE IN AUTOMOBILES HAVING CONTINUOUSLY VARIABLE TRANSMISSION

[75] Inventors: Takashi Shigematsu; Tomoyuki Watanabe; Setsuo Tokoro, all of Susono; Daisaku Sawada, Gotenba, all of Japan

[73] Assignee: Toyota Jidosha Kabushiki Kaisha, Toyota, Japan

[21] Appl. No.: 568,810

[22] Filed: Jan. 6, 1984

[30] Foreign Application Priority Data

Aug. 29, 1983 [JP] Japan .................. 58-156464

[51] Int. Cl.$^4$ .................................. B60K 41/14
[52] U.S. Cl. ............................ 74/866; 74/865
[58] Field of Search ............... 74/854, 856, 865, 866, 74/867; 364/424, 424.1

[56] References Cited

U.S. PATENT DOCUMENTS

| 4,387,608 | 6/1983 | Mohl et al. | 74/866 |
| 4,393,467 | 7/1983 | Miki et al. | 364/424.1 |
| 4,458,318 | 7/1984 | Smit et al. | 364/424.1 |
| 4,458,561 | 7/1984 | Frank | 74/865 |
| 4,459,878 | 7/1984 | Frank | 74/865 |
| 4,462,277 | 7/1984 | Miki et al. | 74/867 |
| 4,466,521 | 8/1984 | Hattori et al. | 74/866 |
| 4,470,117 | 9/1984 | Miki et al. | 74/866 |
| 4,507,986 | 4/1985 | Okamura et al. | 74/866 |
| 4,509,125 | 4/1985 | Fattic et al. | 74/866 |
| 4,515,040 | 5/1985 | Takeuchi et al. | 74/866 |
| 4,546,673 | 10/1985 | Shigematsu et al. | 74/865 X |

FOREIGN PATENT DOCUMENTS

0088252  5/1983  Japan .................. 74/866

Primary Examiner—Leslie Braun
Assistant Examiner—David Novais
Attorney, Agent, or Firm—Oblon, Fisher, Spivak, McClelland & Maier

[57] ABSTRACT

A continuously variable transmission for use in a motor vehicle. A desired engine speed is defined as a nearby engine speed which produces a minimum specific fuel consumption when the engine generates a horsepower requirement as a function of either accelerator or throttle position. The desired engine speed is calculated in accordance with either the detected accelerator stroke or the detected throttle position and vehicle speed. The continuously variable transmission is feedback controlled such that an actual engine speed equals the calculated desired engine speed.

12 Claims, 10 Drawing Figures

POWER TRANSMISSION FOR USE IN AUTOMOBILES HAVING CONTINUOUSLY VARIABLE TRANSMISSION

BACKGROUND OF THE INVENTION

Field of the Invention

This invention relates to a power transmission used for vehicles provided with a continuously variable transmission (hereinafter called a "CVT").

Description of the Prior Art

A speed change ratio is selected in several steps directly through the shift lever operation of a driver in conventional manual transmission, and as a function of a throttle position and vehicle speed in conventional automatic transmissions. While an internal combustion engine is preferably run with a minimum specific fuel consumption, the speed change ratio in conventional transmissions is set in consideration of driveability in acceleration and by steps so that it was difficult to run the internal combustion engine with the minimum specific fuel consumption over the whole running range of the engine. Then, this applicant provided previously a power transmission for vehicles which can controllably run the internal combustion engine with minimum specific fuel consumption over the whole running range by the use of a CVT. Namely, according to the power transmission for vehicles in which the rotation of the internal combustion engine is transmitted to drive wheels through a CVT, the horsepower requirement of the internal combustion engine is determined as a function of operation amount of an accelerator pedal, and the output torque and speed of an engine which is run to achieve the horsepower requirement with the minimum specific fuel consumption are defined as a desired output torque and speed to feedback control the speed ratio of CVT so that the internal combustion engine speed becomes the desired one and feedback control the throttle position of an intake system through a throttle actuator so that the output torque of the internal combustion engine becomes the desired one. In conventional vehicles with stepped speed change gears, a throttle valve and an accelerator pedal are connected to an engine so as to have strict reliability, responsive property and accuracy, so that the precise operation of the throttle actuator is required, which provides an obstacle to the realization of said power transmission for vehicles.

Also, in a belt system CVT, engine power is transmitted from the input side pulley through a belt to the output side pulley and the pressing force of the output side pulley to the belt is controlled by line pressure supplied to the output side hydraulic cylinder. Though the line pressure should ensure the power transmission by avoiding the slip of the belt while being controlled to a minimum value necessary for restraining the drive loss of an oil pump, the line pressure is calculated as a function of only torque of the output side pulley in conventional line pressure controls so that insufficient control accuracy, secure power transmission and drive loss restraint of the oil pump are left unimproved.

SUMMARY OF THE INVENTION

An object of the present invention is to provide a power transmission for vehicles which can control operation of an internal combustion engine with a minimum specific fuel consumption over the whole running range without the use of a throttle actuator.

A further object of the present invention is to provide a line pressure control for a belt system CVT which improves the control accuracy of line pressure to more satisfactorily ensure the power transmission and the restraint of drive loss of an oil pump.

According to the present invention to achieve these objects, in the power transmission for vehicles to transmit the power of internal combustion engine through CVT to drive wheels, a horsepower requirement of the internal combustion engine is defined as a function of the throttle position $\theta$ of an intake system, and engine speed in which the engine is run to achieve the hosepower requirement with the minimum specific fuel consumption is defined as a function of throttle position $\theta$ of the intake system, the engine speed defined as the function of the throttle position $\theta$ of intake system being assumed to be a desired engine speed Ne' and furthermore, the desired engine speed Ne' being corrected by vehicle speed in consideration of the clutch specific characteristic and transmission efficiency. The engine speed is feedback controlled on the basis of the difference between an actual engine speed Ne and the desired engine speed Ne'.

Further in addition to such feedback control of the engine speed, according to the present invention, the engine output torque is calculated as a function of the intake system throttle position $\theta$ or accelerator stroke and engine speed Ne, and belt pressing pressure on the output side disk of the belt system CVT is controlled as a function of the calculated engine output torque Te and belt engaging radius Ro at the output disk side of the belt system CVT or as a function of an approximate Ro' of the belt engaging radius. Further, the belt engaging radius Ri at the input disk side is a function of Ro, and Nout/Nin is a function of Ro or Ro', provided Nout is the rotational speed of an output shaft of the CVT and Nin is the rotational speed of an input shaft of the CVT. The belt pressing pressure on the output side disk is related to the line pressure which for example corresponds to Vout defined according to the following formula;

$$V_{out} = K2 \cdot Te \cdot Nout/Nin \qquad (1)$$

where K2 is a constant.

Thus, the internal combustion engine can be run with minimum specific fuel consumption over the whole horse power requirement by controlling the speed ratio e of the CVT in relation to the throttle position $\theta$th without using the throttle actuator. Further, torque transmission in the CVT can be ensured while avoiding drive loss by calculating the engine output torque from the throttle position and the engine speed to control servo oil pressure in the output disk of CVT.

Further, according to the present invention, in the line pressure control of a belt system CVT wherein the belt system CVT has a belt for transmitting engine power from the input side pulley to the output side pulley so that line pressure is supplied to a hydraulic cylinder of the output side pulley to control pressing force of the output side pulley to the belt, Vout is defined as the following formulae;

$$V_{out} = K2 \cdot Tin \cdot \frac{e+1}{e} \qquad (2)$$

$$V_{out} = K2 \cdot Tin \cdot \frac{e+1}{e} + K3 \cdot Nout^2 \qquad (3)$$

$$V_{out} = K2 \cdot Tin \cdot \frac{e+1}{e} + K3 \cdot Nout^2 + K4 \cdot Ne \quad (4)$$

$$V_{out} = K2 \cdot Tin \cdot \frac{e+1}{e} + K3 \cdot Nout^2 + K4 \cdot Ne + K5 \cdot \Delta x \quad (5)$$

or $$V_{out} = K2 \cdot Tin \cdot \frac{e+1}{e} + K3 \cdot Nout^2 + K4 \cdot Ne + K5 \cdot \Delta x + \Delta P \quad (6)$$

provided

K2, K3, K4 and K5 are constants,

Tin is the torque of the input side pulley, e is the speed ratio of belt system CVT (=Nout/Nin), Nout is the rotational speed of the output side hydraulic cylinder, Ne is the engine speed, $\Delta x$ is the difference $|x'-x|$ between a desired position $x'$ and an actual position $x$ of the input side or output side pulley, and $\Delta P$ is a pressure increment allowing for the line pressure and further Tin and Te are in relation of function to each other.

Thus a pressure regulating valve is provided which generates the line pressure corresponding to Vout defined as any of formula (2)–(6).

In other words, according to this invention, the pressure regulating valve for generating the line pressure related to torque Tin of the input side pulley is provided and a means is provided which obtains Tin from the following formulae;

$$Tin = Tcl \quad (7)$$

$$Tin = Te + \Delta Te + K6 \cdot (dNe/dt) \quad (8)$$

or $$Tin = Te + \Delta Te + K6 \cdot (dNe/dt) + K7 \cdot (dNin/dt) \quad (9)$$

provided

Tcl is the torque transmitted from a crankshaft of an engine through a clutch to the input side pulley, Te is the engine torque corresponding to throttle position $\theta$, $\Delta Te$ is an increment of engine torque corresponding to air-fuel ratio reduction of mixture, K6 and K7 are constants, dNe/dt is the differential value of engine speed Ne with respect to time, and dNin/dt is the differential value of rotational speed Nin of the input side pulley with respect to time.

Torque transmitted from the belt to the output side pulley is Tin/e and the belt engaging radius in the output side pulley is approximately proportional to 1/(1+e). Since the more the transmitted torque Tin/e is increased and the more the belt engaging radius is decreased, the more the belt is likely to slip over the surface of the output side pulley, the controlling accuracy of the line pressure can be improved by making the line pressure proportional to (Tin/e)·(e+1), i.e. defining Vout as formula (2) to set the line pressure corresponding to the belt transmitted torque and the belt engaging radius.

The output side hydraulic cylinder rotates integrally with output side pulley and a centrifugal force proportional to the square of the rotational speed of the output side hydraulic cylinder, i.e. the rotational speed Nout of the output side pulley acts on oil in the cylinder. Oil pressure in the cylinder is raised by this centrifugal force to produce results similar to the rise of the line pressure. However, since a corrective term of K3·Nout$^2$ is added by formula (3), the increment of oil pressure caused by the centrifugal force can be compensated. A pressure regulating valve such as electromagnetic type relief valve controls the communicational sectional area between the oil pump side port and the line pressure oil path side port thereof according to the input current thereto. The line pressures generated at the line pressure oil path side port of the pressure regulating valve are different at the same communicational sectional area, since the speeds Ne of an engine, which drives an oil pump, and therefore output pressures of an oil pump are different. In formula (4) the corrective term K4]Ne is added so that the line pressure error accompanying the input pressure change in the pressure regulating valve can be compensated for.

To ensure speed change without any problems occurring in the transient time, namely rapid speed change, it is necessary to ensure the line pressure in response to the necessary speed change. While the input side or output side movable pulley moves axially in relation to the speed change, the magnitude of the speed change relates to the difference $\Delta x(|x'-x|)$ between the desired position $x'$ and the present position $x$ of the input side or output side variable pulley. The difference $\Delta x$ can be replaced with the sum value of required flow at the flow controlling valve. Since the corrective term K5·$\Delta x$ is added in formula (5), the line pressure is corrected according to the magnitude of the speed change to ensure the rapid speed change in the transient time.

To ensure the torque transmission in any running condition, it is preferable to give a predetermined allowance to the line pressure. The corrective term $\Delta P$ for such allowance is added by formula (6) to ensure the torque transmission in any running condition.

The torque Tin of the input side pulley equals the torque transmitted to the input side pulley through a clutch provided between the output shaft of the engine and the input shaft of the CVT. Tin can be substituted by Tcl according to formula (7).

In the CVT the engine output torque is a function of the throttle position $\theta$. However, in warming-up or during acceleration, the fuel injection amount is increased and the engine output torque is increased to improve driveability. Increment $\Delta Te$ in formula (8) corresponds to the increment of the engine output torque caused by the increase of fuel injection amount, i.e. the decrease of air-fuel ratio of mixture, and the line pressure can be increased correspondingly to the increment of the engine output torque due to the air-fuel ratio reduction of mixture by introducing increment $\Delta Te$.

Torque Tin of the input side pulley varies in relation to the change differential valve dNe/dt of the engine speed Ne with respect to time. By introducing the corrective term K6·(dNe/dt) in formula (8), the torque transmission accommodating the change in torque Tin accompanying differential valve dNe/dt can be ensured.

When the clutch is interposed between the output shaft of engine and the input shaft of the CVT, the differential valve dNe/dt in the engine speed Ne with respect to time is not equalized to the differential valve dNin/dt in the rotational speed Nin of the input side pulley with respect to time due to the slip of the clutch so that torque Tin of the input side pulley accompanying differential valve dNin/dt is changed. The corrective term K7·(dNin/dt) is added in formula (9) to accommodate the change in torque Tin accompanying differential valve dNin/dt so that the torque transmission can be ensured.

BRIEF DESCRIPTION OF THE DRAWINGS

Other objects and advantages of the present invention will become apparent from the following description taken into conjunction with the accompanying drawings, in which.

DESCRIPTION OF THE PREFERRED EMBODIMENTS

Figure 1:
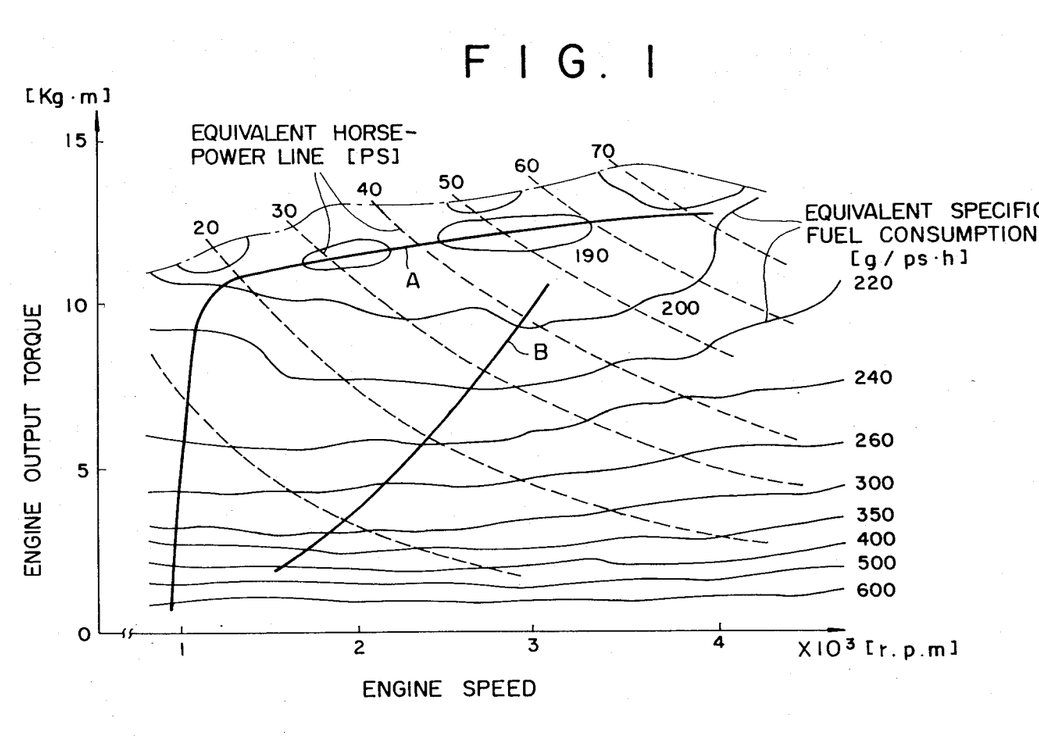
FIG. 1 is a graph illustrating horsepower lines and specific fuel consumption lines on a system of engine load-engine torque coordinates.

FIG. 1 shows equivalent specific fuel consumption lines (solid line) and equivalent horsepower lines (broken line) on engine speed-engine output torque. Further the unit of the equivalent horse power line is PS and the unit of the equivalent specific fuel consumption line g/PS.h. The dash-dot line shows the property of a throttle valve when it is fully opened, i.e. the running limit of the engine. Line A consists of points of minimum specific fuel consumption in each output horsepower valve. When this line corresponded to line B in the speed ratio of conventional transmissions the specific fuel consumption was not good. According to the present invention the desired horse power of the engine is set as a function of operating amount of a accelerator pedal, i.e. the degree of pedalling to run an internal combustion engine so that the engine speed and the engine output torque are specified by the line A for each desired horsepower.

Figure 2:
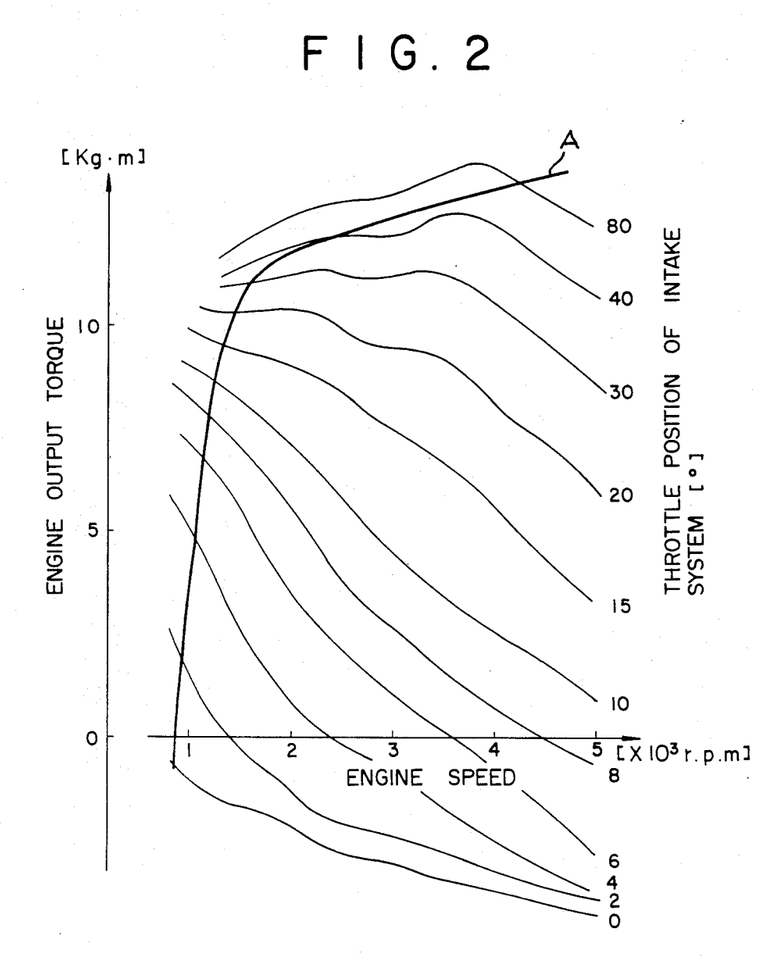
FIG. 2 is a graph showing the relationship among throttle position, engine speed and engine output torque.
Figure 3:
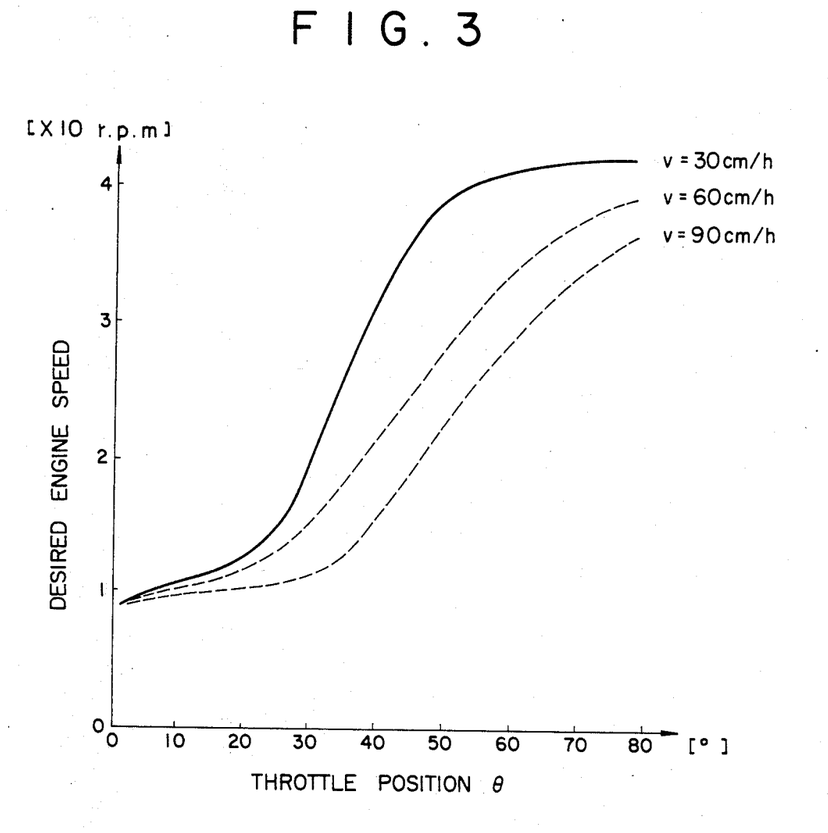
FIG. 3 is a graph showing the relationship between the throttle position and the engine speed which is defined in accordance with line A of FIG. 2.

FIG. 2 shows the relationship between the engine speed and the engine output torque having a parameter of the throttle position of an intake system. Line A coincides with line A shown in FIG. 1, and in the throttle position $\theta th = 10°$ for example the specific fuel consumption becomes minimum with 8.5 kg.m engine output torque and 1250 rpm engine speed. Thus, when the engine is run along the line A, the engine speed is a function of the throttle position $\theta$. When the engine speed as the function of the throttle position $\theta$ specified by the line A is assumed to be a desired engine speed Ne', the relationship between the throttle position $\theta$ and the desired engine speed Ne' is shown in FIG. 3 (solid line). In FIG. 3, the desired engine speed is corrected by vehicle speed because of optimizing an engine, clutch and the CVT system (broken line). Under the normal condition, the desired engine speed Ne' is calculated from the throttle position $\theta$ and vehicle speed, and when the speed ratio e of the CVT is controlled so that actual engine speed Ne becomes the desired engine speed Ne', then the engine output torque is as specified by line A in FIG. 1 to run the engine with minimum specific fuel consumption. In acceleration, the engine torque corresponding to the throttle position $\theta$ is generated by the control delay of the CVT and thereafter the engine speed Ne becomes the desired engine speed Ne'. Also in deceleration, similarly due to the control delay of the CVT, with the engine speed being unchanged, the engine output torque is previously reduced and then the engine speed is reduced as the throttle position is displaced toward the closed position. Namely in the transient time, the change in the engine output torque due to the control delay of the CVT precedes the change in the engine speed to compensate for degradation of running performance.

While various mechanisms have been so far proposed for the CVT, an embodiment of a compact belt system CVT with a large capacity of transmitting torque will now be described.

Figure 4:
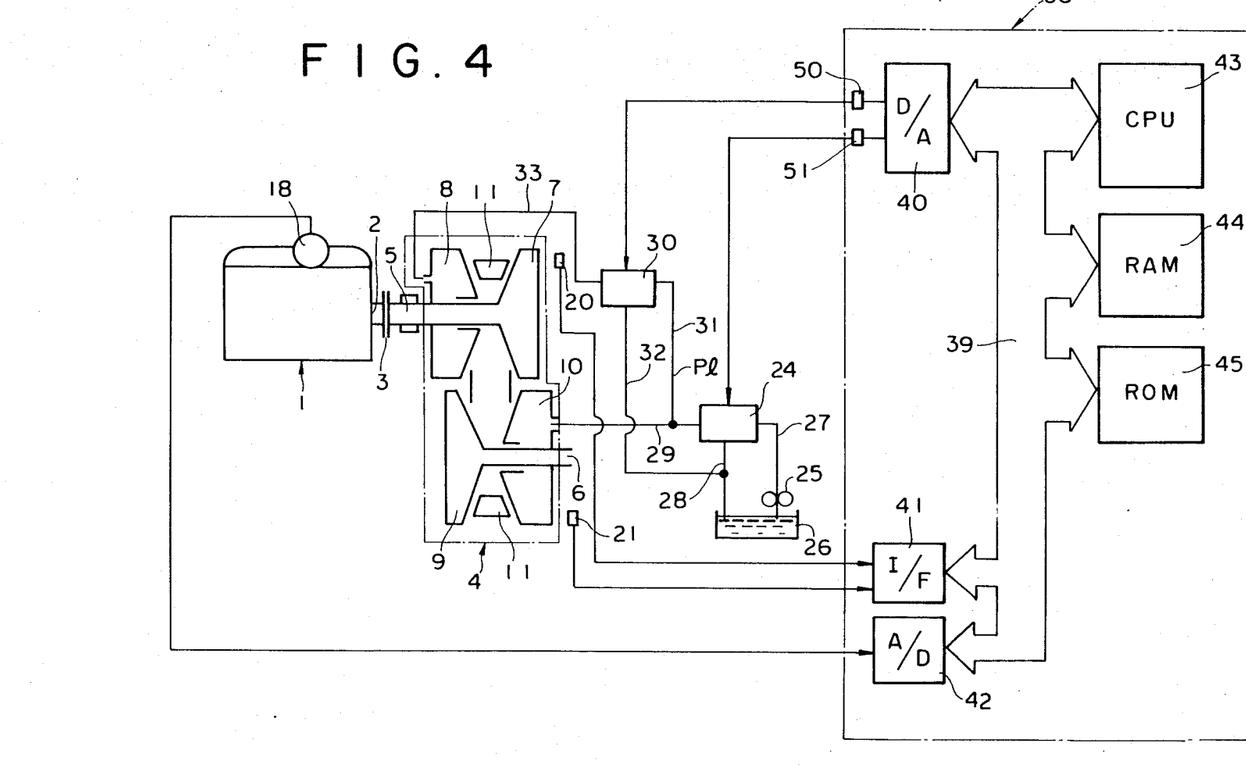
FIG. 4 shows a construction of an embodiment in accordance with the present invention.

In FIG. 4, the output shaft 2 of an internal combustion engine 1 is connected to the input shaft 5 of the CVT 4 through a clutch 3. The input shaft 5 and the output shaft 6 of CVT 4 are arranged parallel to each other. The input side fixed disk 7 is secured fixedly to the input shaft 5 and the input side movable disk 8 fits axially movably on the outer periphery of the input shaft 5 through splines or ball bearings. The output side fixed disk 9 is secured fixedly to the output shaft 6 and the output side movable disk 10 fits axially movably on the outer periphery of the output shaft 6 through splines or ball bearings. Further the pressure receiving area of the movable side disk is set to provide the input side >- the output side, and the fixed and movable disks in the input and output sides are arranged axially in the opposite direction to each other. The opposed surfaces of the fixed disks 7, 9 and the movable disks 8, 10 are formed so as to be tapered to increase the distances between themselves radially outward so that a belt 11 having an isosceles trapezoidal section is trained over the input and output side disks. Thus, as fastening forces on the fixed and movable disks are changed, the radial contact positions of the belt 11 on the disk surfaces are changed continuously. When the contact positions of the belt 11 on the surfaces of the input side disks 7, 8 move radially outward, the contact positions of the belt 11 on the surfaces of the output disks 9, 10 move radially inward to increase the speed ratio e of $$CVT 4 \left( = \frac{\text{rotational speed Nout of output shaft 6}}{\text{rotational speed Nin of input shaft 5}} \right)$$

and in the reverse case, speed ratio e is decreased. The power of the output shaft 6 is transmitted to drive wheels (not shown). A throttle position sensor 18 detects the throttle position θ of the intake system. An accelerator pedal is connected to a throttle valve of the intake system so that the engine output horsepower becomes a desired function of the pedalling amount of the accelerator pedal. The input and output side rotary angle sensors 20, 21 detect respectively the rotary angles, thus the number of revolution of the disks 7, 10. A pressure regulating valve 24 controls the amount of oil escaping to an oil path 28 as hydraulic medium sent from a reservoir 26 through an oil path 27 by an oil pump 25 to regulate line pressure Pl in an oil path 29. The line pressure Pl is supplied through the oil path 29 to a hydraulic servo of the output side movable disk 10. A flow controlling valve 30 controls an inflow and an outflow of oil to the input side movable disk 8. To maintain the speed ratio e of CVT 4 constant, an oil path 33 is disconnected from a line pressure oil path 31 and a drain oil path 32 is branched from the oil path 29, i.e. to maintain the axial position of the input side movable disk 8 constant for increasing the speed ratio e, and oil is supplied from the oil path 31 to 33 to increase a fastening force between the input side disks 7, 8. To reduce the speed ratio e, oil pressure in the hydraulic servo of the movable disk 8 is adapted to communicate to the atmospheric side through the drain oil path 32 for decreasing the thrust between the input side disks 7, 8. Oil pressure in the oil path 33 is lower than the line pressure Pl. However, since the working area of a piston in the hydraulic servo of the input side movable disk 8 is larger than the working area of a piston in the hydraulic servo of the output side movable disk 10, the fastening force between the input side disks 7, 8 can be made larger than that between the output side disks 9, 10. To generate the fastening force for ensuring the torque transmission without any slip of the belt 11 in the output side disks 9, 10, the line pressure Pl is controlled by the pressure regulating valve 24 and the fastening force between the input side disks 7, 8 is changed by the flow controlling valve 30 to control the speed ratio. An electronic control 38 comprises a D/A (Digital/Analog) converter 40, an input interface 41, an A/D (Analog/Digital) converter 42, a CPU 43, a RAM 44 and a ROM 45 connected to each other by an address data bus 39. The analog output of the throttle position sensor 18 is sent to the A/D converter 42 and pulses of the rotary angle sensors 20, 21 are sent to the input interface 41. Output pulses of rotary angle sensors 20, 21 are sent to the input interface 41. Output signals from the D/A converter 40 are sent to the flow controlling valve 30 and the pressure regulating valve 24 respectively through amplifiers 50, 51.

Figure 5:
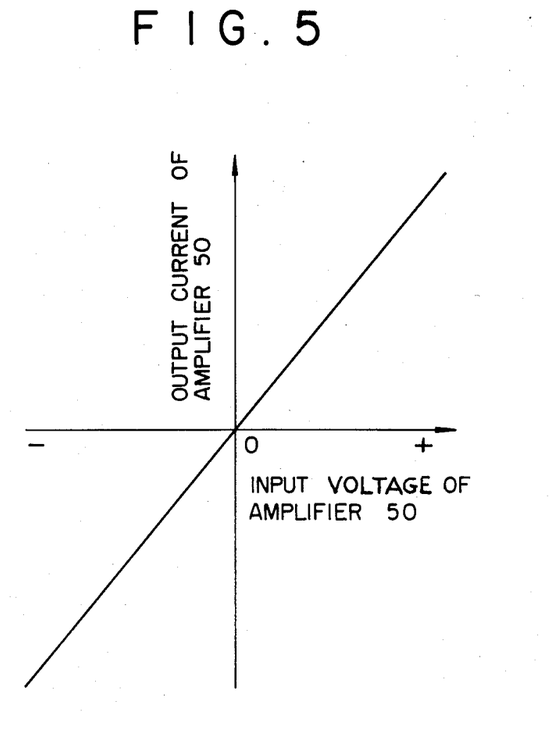
FIG. 5 is a graph illustrating the relationship between the input and the output of an amplifier for a flow rate controlling valve.
Figure 6:
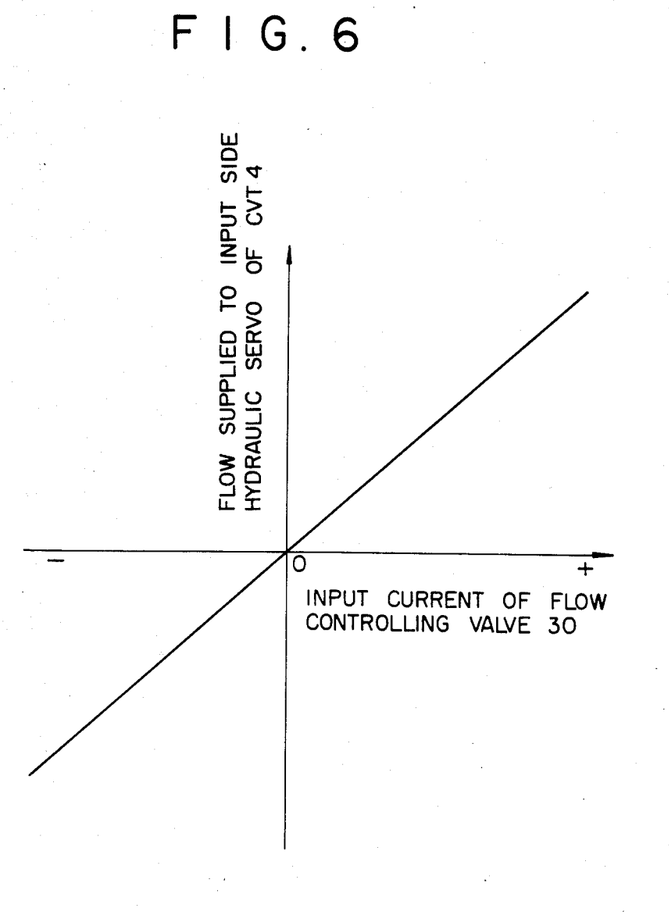
FIG. 6 is a graph illustrating the relationship between the input of the flow rate controlling valve and the speed ratio of the CVT.
Figure 7:
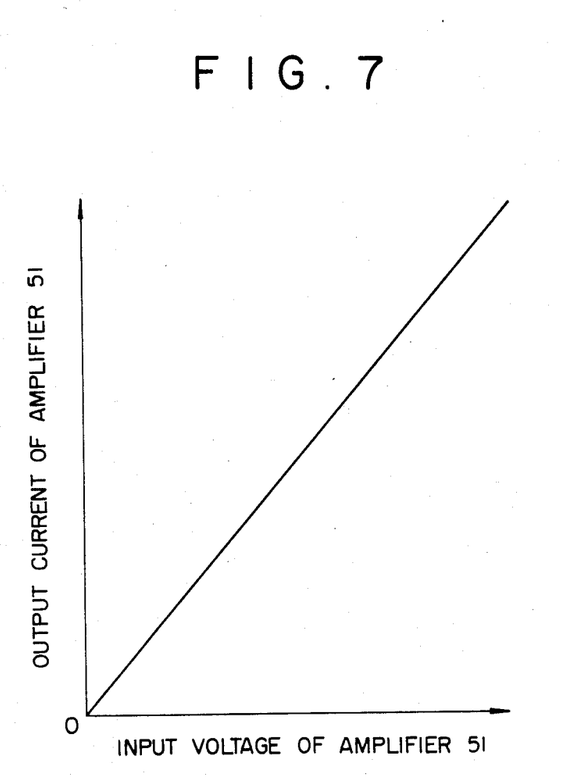
FIG. 7 is a graph illustrating the relationship between the input and the output of a pressure regulating valve.
Figure 8:
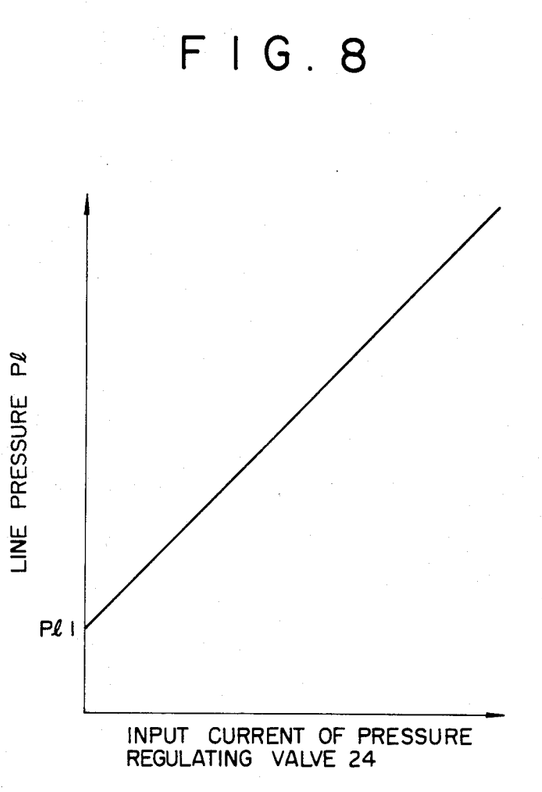
FIG. 8 is a graph illustrating the relationship between the input of the pressure regulating valve and line pressure.

FIG. 5 shows the relationship between the input voltage and the output current of the amplifier 50 for flow controlling valve 30, and FIG. 6 shows the relationship between the input current of the flow controlling valve 30 and the flow to the input side hydraulic servo of CVT 4. Thus, the change in the input voltage of the amplifier 50 is proportional to the speed ratio e. FIG. 7 shows the relationship between the input voltage and the output current of the amplifier 51 for the pressure regulating valve 24, and FIG. 8 shows the relationship between the input current of the pressure regulating valve 24 and the line pressure Pl. Thus the line pressure Pl is changed linearly relative to the change in the input voltage of the amplifier 51. Even if the input current of the pressure regulating valve 24 is zero, the line pressure Pl is maintained at Pl1 (Pl1≠0) so that a predetermined oil pressure is supplied to the hydraulic servos of the movable disks 8, 10 to ensure the minimum torque transmission in CVT 4 even when any disconnections or failures of the electronic control 38 take place.

Figure 9:
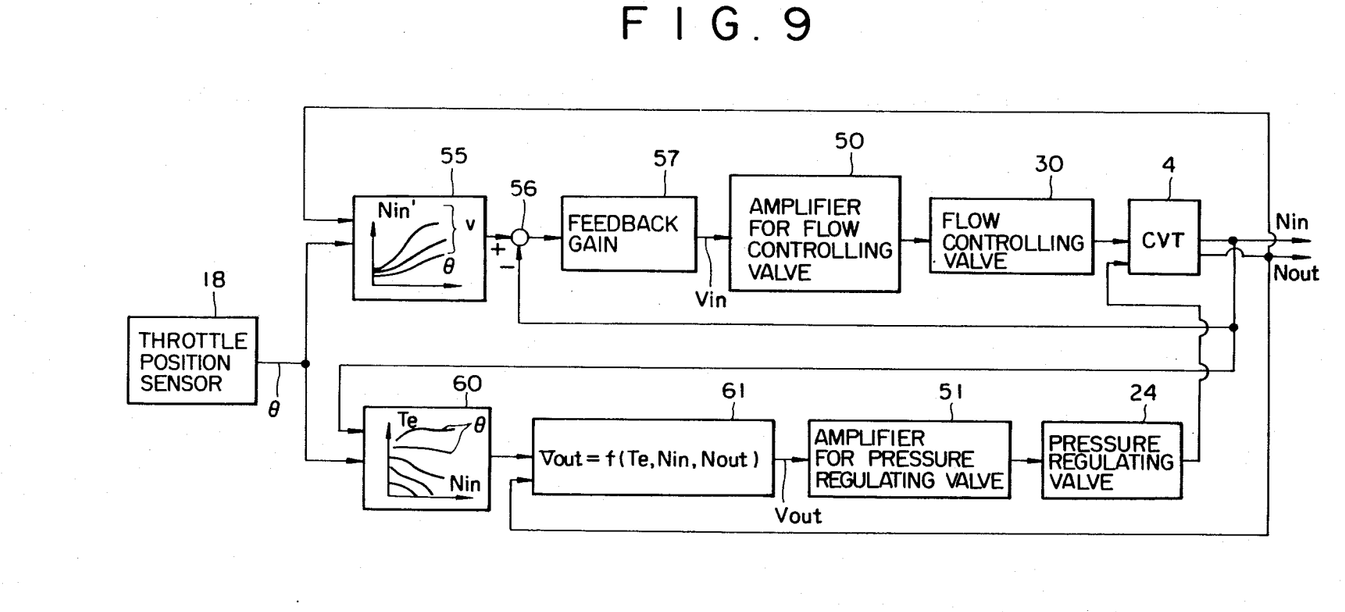
FIG. 9 is a block diagram of an embodiment in accordance with the present invention.

FIG. 9 is a block diagram of an embodiment of this invention. In a block 55 is calculated the desired engine speed Ne', i.e. desired input rotational speed Nin' of CVT 4 (Nin'=Ne' in this embodiment) from the throttle position θ and vehicle speed V. Deviation Nin'−Nin of the desired input rotational speed Nin' from the actual input rotational speed Nin of CVT 4 (Nin−Ne' in this embodiment) is obtained at 56. Nin'−Nin is suitably amplified up to an output voltage to amplifier 50 Vin in a feedback gain 57 to be sent to the flow controlling valve 30 through the amplifier 50 for the flow controlling valve and feedback controlled so that the speed ratio e of CVT 4, thus the engine speed Ne becomes Ne' with the servo oil pressure of the input side disk of CVT 4 being changed. In a block 60 is calculated the actual engine output torque Te from the throttle position θ and the actual input rotational speed Nin of CVT 4. As is shown by the equivalent throttle position line in FIG. 2, the actual engine output torque Te is a function of the throttle position θ and the engine speed Ne. While Te may be detected directly by a well-known torque sensor, the torque sensor may be omitted when Te is calculated.

In a block 61, the output voltage from D/A converter 40 to amplifier 51 (i.e. Vout) for the pressure regulating valve is calculated according to Vout=f(Te, Nin, Nout) from the engine output torque Te, the input and output rotational speed Nin and Nout of CVT 4. The output Vout of the block 61 is sent to the pressure regulating valve 24 through the amplifier 51 for the pressure regulating valve to change the line pressure Pl. As a result, the line pressure Pl is adapted to have the minimum value capable of ensuring the torque transmission by avoiding the slip of the belt 11 so that power loss caused by too much fastening of the disks of CVT 4 can be avoided.

Figure 10:
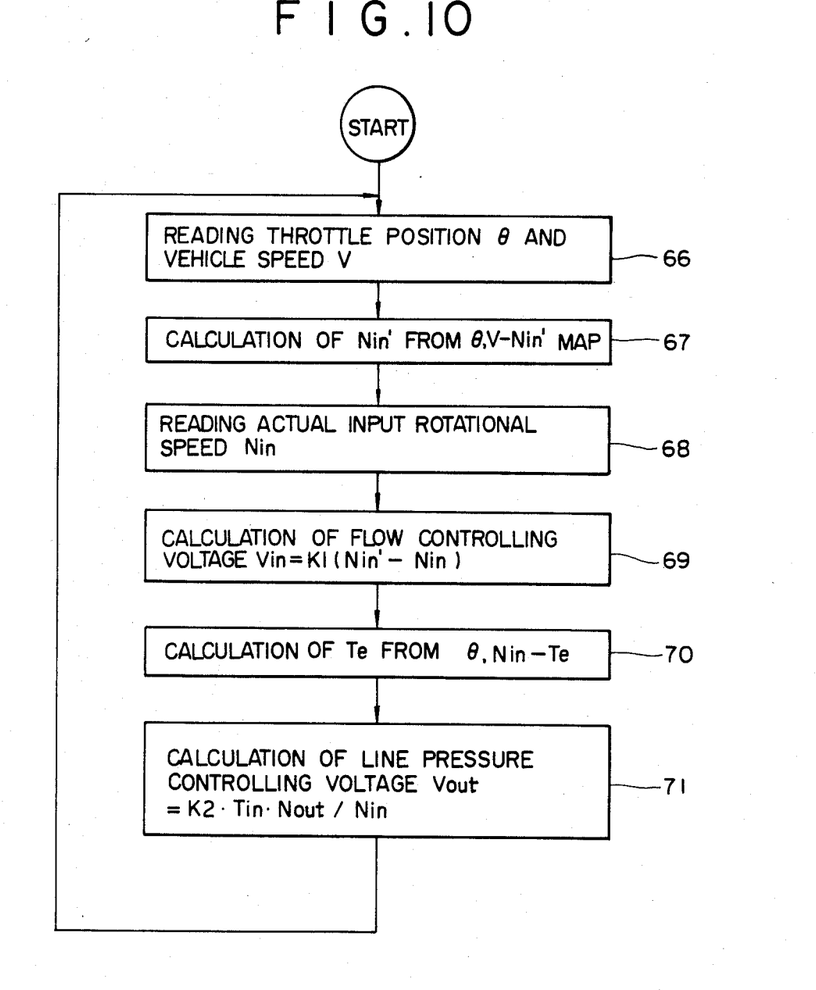
FIG. 10 is a flow chart showing an example of a program in accordance with the block diagram of FIG. 9.

FIG. 10 is a flow chart of a program according to the block diagram in FIG. 9. In step 66 is read the throttle position θ through the input signal from the throttle position sensor 18 and the vehicle speed V from the rotational speed of an output shaft Nout of the CVT. In step 67 is calculated the desired input rotational speed Nin' based upon the map of θ'V−Nin' predetermined on the basis of the characteristic line in FIG. 3. In step 68 is read the actual input rotational speed Nin of CVT 4. In step 69 is calculated the control voltage Vin sent to the amplifier 50 for a flow controlling valve function according to Vin=K1(Nin'−Nin), provided K1 is a constant. In step 70 is calculated the engine output torque Te from θ, Nin on the basis of the θ, Nin−Te map which is specified according to the equivalent throttle position line in FIG. 2. In step 71 is calculated the control voltage Vout sent to the amplifier 51 for the pressure regulating valve according to said formula (1). Instead of formula (1) its is possible to use formulae (2)–(9). Obviously, numerous modifications and variations of the present invention are possible in light of the above teachings. It is therefore to be understood that within the scope of the appended claims, the invention may be practiced otherwise than as specifically described herein.

What is claimed is:

1. A line pressure control for a belt system continuously variable transmission, comprising:
   an input side pulley;
   an output side pulley;
   a belt for transmitting engine power from said input side pulley to said output side pulley with line pressure being supplied to a hydraulic cylinder of the output side pulley to control pressing force of the output side pulley to the belt;
   a pressure regulator valve for generating said line pressure;
   calculating means programmed to calculate the formula:

$$Vout = K2 \cdot Tin \cdot \frac{e+1}{e}$$

wherein
   K2 is a constant,
   Vout is an output voltage value for the pressure regulator valve,
   Tin is a torque of the input side pulley and
   e is a speed ratio of the belt system continuously variable transmission; and
   means applying said calculated output voltage to said pressure regulator valve.

2. A line pressure control for a belt system continuously variable transmission, comprising:
   an input side pulley;
   an output side pulley;
   a belt for transmitting engine power from said input side pulley to said output side pulley with line pressure being supplied to a hydraulic cylinder of the output side pulley to control pressing force of the output side pulley to the belt;
   a pressure regulator valve for generating said line pressure;
   calculating means programmed to calculate the formula:

$$Vout = K2 \cdot Tin \cdot \frac{e+1}{e} + K3 \cdot Nout^2$$

wherein
   K2 and K3 are constants,
   Vout is an output voltage value for the pressure regulator valve,
   Tin is a torque of the input side pulley,
   e is a speed ratio of the belt system continuously variable transmission and
   Nout is a rotational speed of an output side hydraulic cylinder; and
   means applying said calculated output voltage to said pressure regulator valve.

3. A line pressure control for a belt system continuously variable transmission, comprising:
   an input side pulley;
   an output side pulley;
   a belt for transmitting engine power from said input side pulley to said output side pulley with line pressure being supplied to a hydraulic cylinder of the output side pulley to control pressing force of the output side pulley to the belt;
   a pressure regulator valve for generating said line pressure;
   calculating means programmed to calculate the formula:

$$Vout = K2 \cdot Tin \cdot \frac{e+1}{e} + K3 \cdot Nout^2 + K4 \cdot Ne$$

wherein
   K2, K3 and K4 are constants,
   Vout is an output voltage value for the pressure regulator valve,
   Tin is a torque of the input side pulley,
   e is a speed ratio of the belt system continuously variable transmission,
   Nout is a rotational speed of an output side hydraulic cylinder and
   Ne is engine speed; and
   means applying said calculated output voltage to said pressure regulator valve.

4. A line pressure control for a belt system continuously variable transmission, comprising:
   an input side pulley;
   an output side pulley;
   a belt for transmitting engine power from said input side pulley to said output side pulley with line pressure being supplied to a hydraulic cylinder of the output side pulley to control pressing force of the output side pulley to the belt;
   a pressure regulator valve for generating said line pressure;
   calculating means programmed to calculate the formula:

$$Vout = K2 \cdot Tin \cdot \frac{e+1}{e} + K3 \cdot Nout^2 + K4 \cdot Ne + K5 \cdot \Delta x,$$

wherein
   K2, K3, K4 and K5 are constants,
   Vout is an output voltage value for the pressure regulator valve,
   Tin is a torque of the input side pulley,
   e is a speed ratio of the belt system continuously variable transmission,
   Nout is a rotational speed of an output side hydraulic cylinder,
   Ne is engine speed, and
   $\Delta x$ is a difference $|x''-x|$ between a desired position $x'$ and an actual position x of the input side or output side movable pulley; and
   means applying said calculated output voltage to said pressure regulator valve.

5. A line pressure control for a belt system continuously variable transmission, comprising:
   an input side pulley;
   an output side pulley;
   a belt for transmitting engine power from said input side pulley to said output side pulley with line pressure being supplied to a hydraulic cylinder of the output side pulley to control pressing force of the output side pulley to the belt;
   a pressure regulator valve for generating said line pressure;
   calculating means programmed to calculate the formula:

$$Vout = K2 \cdot Tin \cdot \frac{e+1}{e} + K3 \cdot Nout^2 + N4 \cdot Ne + K5 \cdot \Delta x + \Delta P,$$

wherein

K2, K3, K4 and K5 are constants,

Vout is an output voltage value for the pressure regulator valve,

Tin is a torque of the input side pulley, e is a speed ratio of the belt system continuously variable transmission, Nout is a rotational speed of an output side hydraulic cylinder, Ne is engine speed, $\Delta x$ is a difference $|x'-x|$ between a desired position (x') and a position (x) of a movable pulley, and $\Delta P$ is an increment of pressure allowing for the line pressure; and means applying said calculated output voltage value to said pressure regulator valve.

6. A line pressure control of a belt system continuously variable transmission for an engine and having a belt for transmitting engine power from an input side pulley to an output side pulley with a line pressure being supplied to a hydraulic cylinder of the output side pulley to control pressing force of the output side pulley to the belt, comprising:

a pressure regulating valve for generating the line pressure;

a clutch connected to said input side pulley;

calculating means programmed to calculate the formula:

$$Tin = Tel$$

wherein

Tel is a torque transmitted from a crankshaft of said engine through said clutch connected to the input side pulley, and Tin is a torque of the input side pulley; and means controlling said pressure regulating valve as a function of said calculated torque Tin.

7. A line pressure control of a belt system continuously variable transmission having a belt for transmitting engine power from an input side pulley to an output side pulley with line pressure being supplied to a hydraulic cylinder of the output side pulley to control pressing force of the output side pulley to the belt, comprising:

a pressure regulating valve for generating the line pressure;

calculating means programmed to calculate the formula:

$$Tin = Te + \Delta Te + K6 \cdot (dNe/dt)$$

wherein

Te is engine torque corresponding to a throttle position ($\theta$), and an engine speed (Ne), Tin is a torque of the input side pulley, $\Delta Te$ is an increment of engine torque corresponding to an air fuel ratio reduction of mixture, K6 is a constant, and dNe/dt is a differential value of said engine speed (Ne) with respect to time; and means controlling said pressure regulating valve as a function of said calculated torque Tin.

8. A line pressure control of a belt system continuously variable transmission having a belt for transmitting engine power from an input side pulley to an output side pulley with line pressure being supplied to a hydraulic cylinder of the output side pulley to control pressing force of the output side pulley to the belt, comprising:

a pressure regulating valve for generating the line pressure;

calculating means programmed to calculate the formula:

$$Tin = Te + \Delta Te + K6 \cdot (dNe/dt) + K7 \cdot (dNin/dt),$$

wherein

Te is an engine torque corresponding to a throttle position ($\theta$) and an engine speed (Ne), Tin is a torque of the input side pulley, $\Delta Te$ is an increment of engine torque corresponding to an air fuel ratio reduction of mixture, Kt and K7 are constants, dNe/dt is a differential value of said engine speed Ne with respect to time, and dNin/dt is a differential value of a rotational speed (Nin) of said input side pulley with respect to time; and means controlling said pressure regulating valve as a function of said calculated torque Tin.

9. A power apparatus for vehicles in which power of an internal combustion engine is transmitted to drive wheels through a continuously variable transmission, comprising:

a throttle valve of an intake system of said engine;

an accelerator pedal of said engine, said accelerator pedal being connected to said throttle valve so that the engine output horsepower requirement is a function of the position of the accelerator pedal;

means for detecting the position of said accelerator pedal;

memory means defining a desired engine speed as a function of accelerator position and vehicle speed over the operational speed range of the engine, wherein a given accelerator position and vehicle speed uniquely define a desired engine speed which will operate the engine at said horsepower requirement with minimum specific fuel consumption; and means for causing said engine to achieve said desired engine speed, comprising means for calculating a difference between actual engine speed and said desired engine speed and feedback control means controlling said continuously variable transmission on the basis of said calculated difference until said desired engine speed is achieved.

10. A power apparatus for vehicles in which power of an internal combustion engine is transmitted to drive wheels through a continuously variable transmission, comprising:

a throttle valve of an intake system of said engine;

means for detecting the position of said throttle valve;

an accelerator pedal of said engine, said accelerator pedal being connected to said throttle valve so that the engine output horsepower requirement is a function of the position of the accelerator pedal;

memory means defining a desired engine speed as a function of throttle position and vehicle speed over the operational speed range of the engine, wherein a given throttle position and vehicle speed uniquely define a desired engine speed which will operate the engine at said horsepower requirement with minimum specific fuel consumption; and means for causing said engine to achieve said desired engine speed, comprising means for calculating a difference between actual engine speed and said desired engine speed and feedback control means controlling said continuously variable transmission on the basis of said calculated difference until said desired engine speed is achieved.

11. A power apparatus for vehicles in which power of an internal combustion engine is transmitted to drive wheels through a belt system continuously variable transmission, comprising:

a throttle valve of an intake system of said engine;

an accelerator pedal of said engine, said accelerator pedal being connected to said throttle valve so that the engine output horsepower requirement is a function of the position of the accelerator pedal;

means for detecting the position of said accelerator pedal;

memory means defining a desired engine speed as a function of accelerator position and vehicle speed over the operational speed range of the engine, wherein a given accelerator position and vehicle speed uniquely define a desired engine speed which will operate the engine at said horsepower requirement with minimum specific fuel consumption;

means for causing said engine to achieve said desired engine speed, comprising means for calculating a difference between actual engine speed and said desired engine speed and feedback control means controlling said continuously variable transmission on the basis of said calculated difference until said desired engine speed is achieved;

means for calculating an engine output torque as a function of said intake system throttle position and engine speed from an intake system throttle position and the actual engine speed; and means for controlling belt pressing pressure on output side disks of the belt system continuously variable transmission as a function of calculated engine output torque and an output disk side belt engaging radius of the belt system continuously variable transmission.

12. A power apparatus for vehicles in which power of an internal combustion engine is transmitted to drive wheels through a belt system continuously variable transmission, comprising:

a throttle valve of an intake system of said engine;

means for detecting the position of said throttle valve;

an accelerator pedal of said engine, said accelerator pedal being connected to said throttle valve so that the engine output horsepower requirement is a function of the position of the accelerator pedal;

memory means defining a desired engine speed as a function of throttle position and vehicle speed over the operational speed range of the engine, wherein a given throttle position and vehicle speed uniquely define a desired engine speed which will operate the engine at said horsepower requirement with minimum specific fuel consumption;

means for causing said engine to achieve said desired engine speed, comprising means for calculating a difference between actual engine speed and said desired engine speed and feedback control means controlling said continuously variable transmission on the basis of said calculated difference until said desired engine speed is achieved;

means for calculating an engine output torque as a function of said intake system throttle position and engine speed from an intake system throttle position and the actual engine speed; and means for controlling belt pressing pressure on output side disks of the belt system continuously variable transmission as a function of calculated engine output torque and an approximation of an output disk side belt engaging radius of the belt system continuously variable transmission.

* * * * *